(12) United States Patent
Long

(10) Patent No.: US 8,210,807 B2
(45) Date of Patent: Jul. 3, 2012

(54) GAS TURBINE AIRFOIL ASSEMBLIES AND METHODS OF REPAIR

(75) Inventor: Merrell W. Long, North Waterboro, ME (US)

(73) Assignee: United Technologies Corporation, Hartford, CT (US)

(*) Notice: Subject to any disclaimer, the term of this patent is extended or adjusted under 35 U.S.C. 154(b) by 903 days.

(21) Appl. No.: 12/199,952

(22) Filed: Aug. 28, 2008

(65) Prior Publication Data
US 2010/0050434 A1 Mar. 4, 2010

(51) Int. Cl.
*F04D 29/60* (2006.01)
(52) U.S. Cl. ............. 415/209.3; 415/213.1; 415/215.1
(58) Field of Classification Search ............. 415/209.3, 415/213.1, 215.1
See application file for complete search history.

(56) References Cited

U.S. PATENT DOCUMENTS

| | | | |
|---|---|---|---|
| 5,269,057 A * | 12/1993 | Mendham | 29/889.1 |
| 5,272,809 A | 12/1993 | Robertson et al. | |
| 5,690,469 A | 11/1997 | Deal et al. | |
| 5,758,416 A * | 6/1998 | Reverman et al. | 29/889.1 |
| 5,813,832 A * | 9/1998 | Rasch et al. | 415/200 |
| 6,154,959 A * | 12/2000 | Goodwater et al. | 29/889.1 |
| 6,173,491 B1 * | 1/2001 | Goodwater et al. | 29/889.1 |
| 6,302,625 B1 | 10/2001 | Carey et al. | |
| 6,339,878 B1 | 1/2002 | Owen et al. | |
| 6,416,278 B1 | 7/2002 | Caddell, Jr. et al. | |
| 7,185,433 B2 | 3/2007 | Miller et al. | |
| 7,651,319 B2 * | 1/2010 | Anderson et al. | 415/209.3 |
| 7,980,813 B2 * | 7/2011 | Medynski et al. | 415/119 |
| 2008/0063521 A1 * | 3/2008 | Bogue et al. | 415/209.3 |

* cited by examiner

Primary Examiner — George Fourson, III
(74) Attorney, Agent, or Firm — Carlson, Gaskey & Olds, P.C.

(57) ABSTRACT

Gas turbine airfoil assemblies and methods of repair are provided. In this regard, a representative method includes: separating the airfoil from the platform; forming a depression in the platform, the depression being sized and shaped to receive a replacement airfoil; and affixing the replacement airfoil within the depression such that the replacement airfoil is attached to the platform.

17 Claims, 4 Drawing Sheets

GAS TURBINE AIRFOIL ASSEMBLIES AND METHODS OF REPAIR

BACKGROUND

1. Technical Field

The disclosure generally relates to gas turbine engines.

2. Description of the Related Art

Gas turbine engine airfoil assemblies incorporate platforms from which airfoils (e.g., vanes) extend. In operation, these airfoil assemblies are exposed to high temperatures and corrosive air, both of which can damage the airfoils and limit service life. For an airfoil that is cantilevered, associated stresses may cause twisting of the vane, which could result in cracks being formed in an airfoil portion. Alternatively, a foreign object may enter the gas turbine engine and hit an airfoil causing the airfoil to become cracked or chipped. In some cases, such as when one airfoil of an airfoil assembly, which includes multiple airfoils extending from a platform, is damaged, the entire airfoil assembly is removed and retired from service.

SUMMARY

Gas turbine airfoil assemblies and methods of repair are provided. In this regard, an exemplary embodiment of a method of repairing a gas turbine airfoil assembly comprising a platform and an airfoil, the method comprises the steps of: separating the airfoil from the platform; forming a depression in the platform, the depression being sized and shaped to receive a replacement airfoil; and affixing the replacement airfoil within the depression such that the replacement airfoil is attached to the platform.

Another exemplary embodiment of a method comprises the steps of: A method of repairing a gas turbine airfoil assembly comprising a platform and an airfoil, the method comprising the steps of: separating the airfoil from the platform; forming a depression in the platform, the depression being sized and shaped to receive a replacement airfoil; and affixing the replacement airfoil within the depression such that the replacement airfoil is attached to the platform.

An exemplary embodiment of a gas turbine airfoil assembly comprises: a platform operative to mount an airfoil along a gas flow path of a gas turbine engine, the platform having a slot formed therethrough; and a replacement airfoil extending at least partially into the slot and being affixed therein.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine airfoil assemblies and methods of repair are provided, several exemplary embodiments of which will be described in detail. In this regard, one or more airfoils of an airfoil assembly can be replaced so that an entire assembly need not be retired from service. In some embodiments, this is accomplished by removing an airfoil from an associated platform of the assembly and forming a depression in the platform that is configured to accommodate attachment of a replacement airfoil. In some embodiments, an electrical discharge machining (EDM) process is used to remove the airfoil and/or form the depression in the platform. In alternative embodiments, milling and/or laser cutting can be used to remove the airfoil and/or form the depression in the platform.

Figure 1:
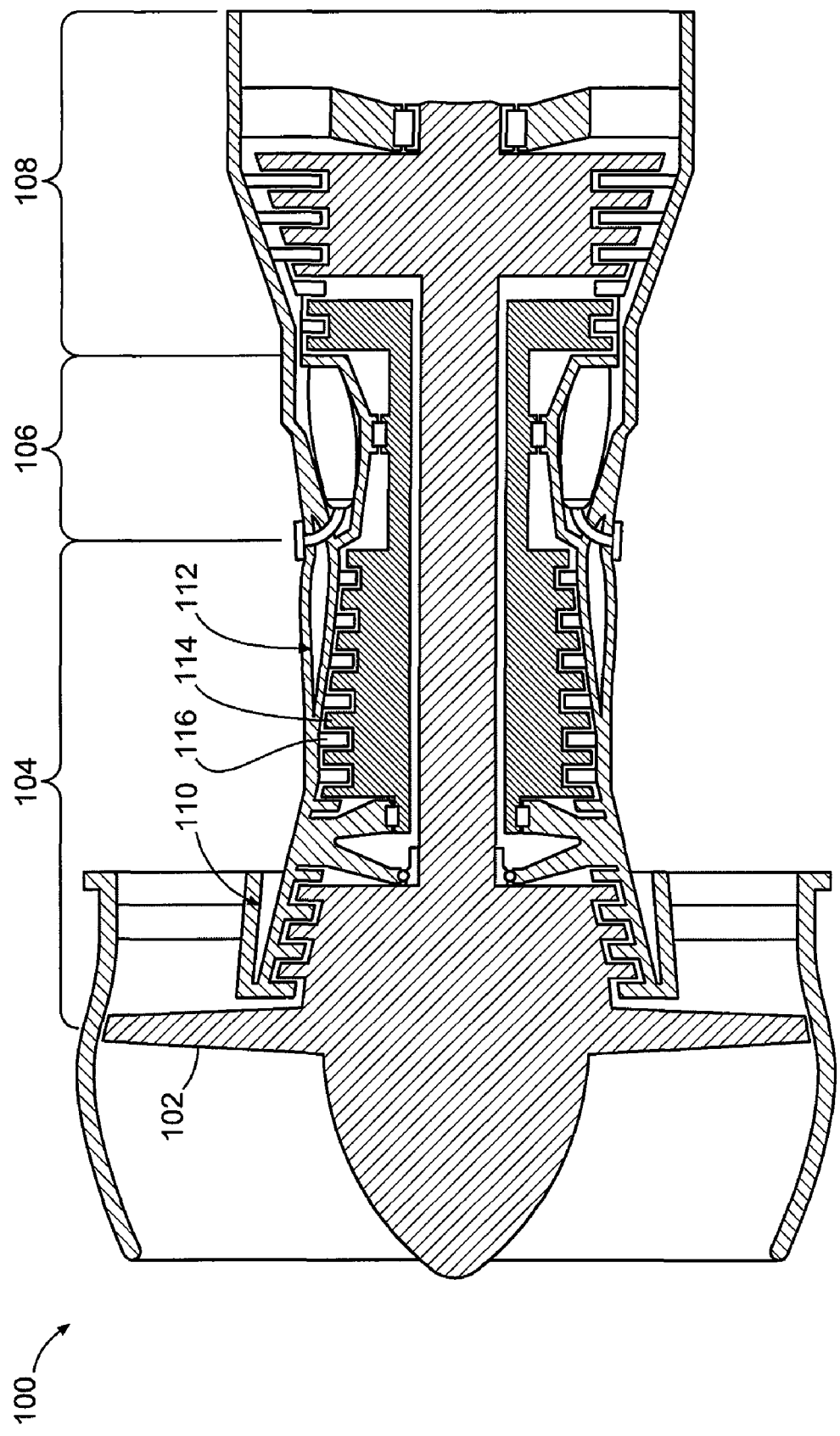
FIG. 1 is a schematic diagram depicting an exemplary embodiment of a gas turbine engine.

FIG. 1 is a schematic diagram depicting an exemplary embodiment of a gas turbine engine 100. As shown in FIG. 1, engine 100 is depicted as a turbofan that incorporates a fan 102, a compressor section 104, a combustion section 106 and a turbine section 108. Although depicted as a turbofan gas turbine engine, it should be understood that the concepts described herein are not limited to use with turbofans as the teachings may be applied to other types of gas turbine engines.

In FIG. 1, engine 100 includes a low pressure compressor 110 and a high pressure compressor 112. Each of the compressors incorporates rotating sets of airfoils (e.g., blade 114) and stationary sets of airfoils (e.g., vane 116).

Figure 2:
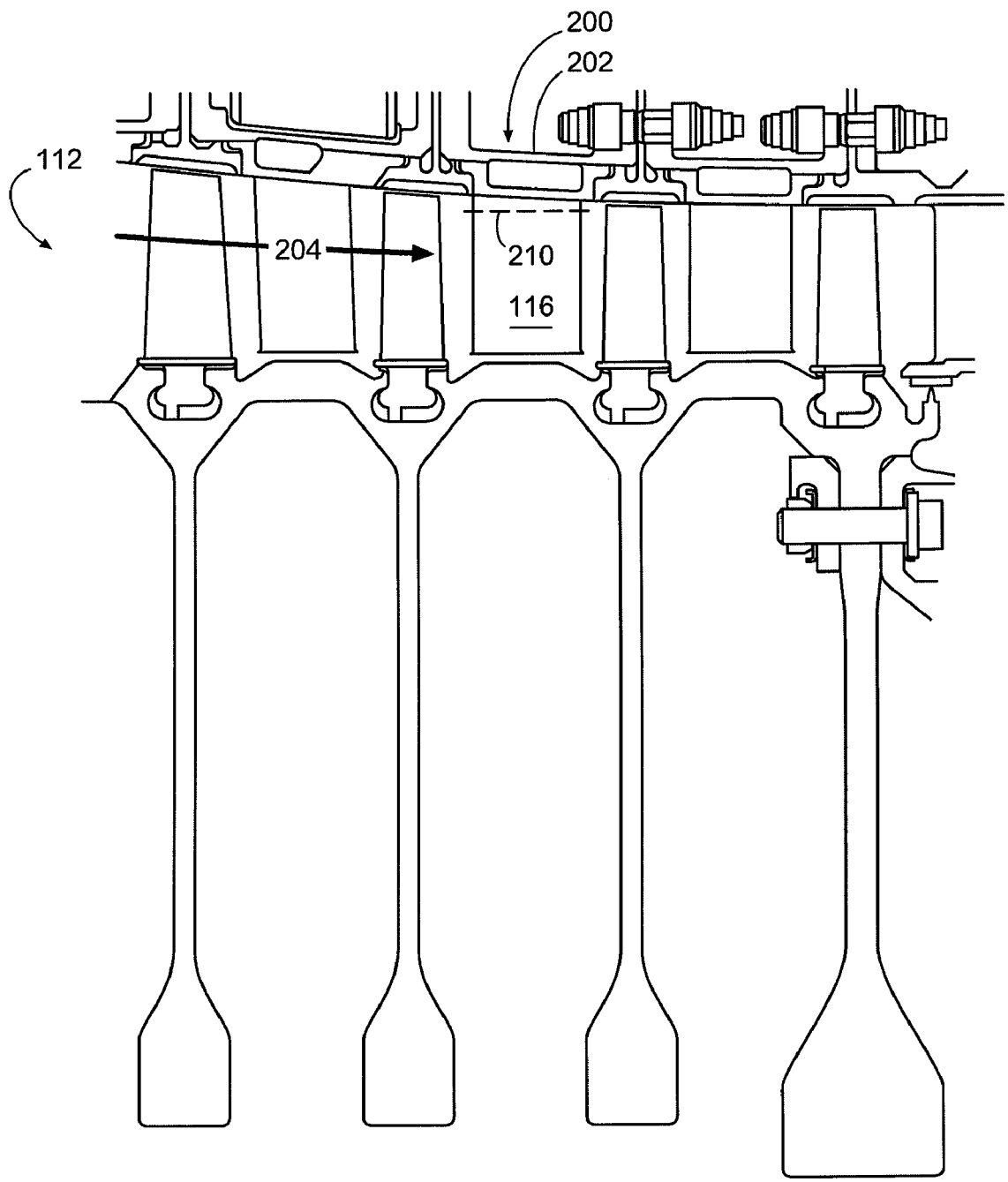
FIG. 2 is a schematic diagram depicting a portion of the high pressure compressor of the embodiment of FIG. 1.

As shown in FIG. 2, which depicts a portion of high pressure compressor 112, vane 116 is a portion of an airfoil assembly 200 that includes a platform 202. Specifically, platform 202 is an outer diameter platform from which vane 116 extends. Airfoil assembly 200 is one of multiple such assemblies (not shown) that are oriented circumferentially about the engine so that respective vanes of the assemblies extend radially across a gas flow path 204 of the engine. Since, in this embodiment, airfoil assembly 200 uses only a single platform, vane 116 is considered a cantilevered airfoil.

Also depicted in FIG. 2 is a possible detachment location, which is represented by dashed line 210 oriented in a chord-wise direction. The detachment location is a location of the airfoil along which airfoil 116 can be separated from the remainder of the airfoil assembly 200 during an airfoil repair procedure that involves replacement of the airfoil.

Figure 3:
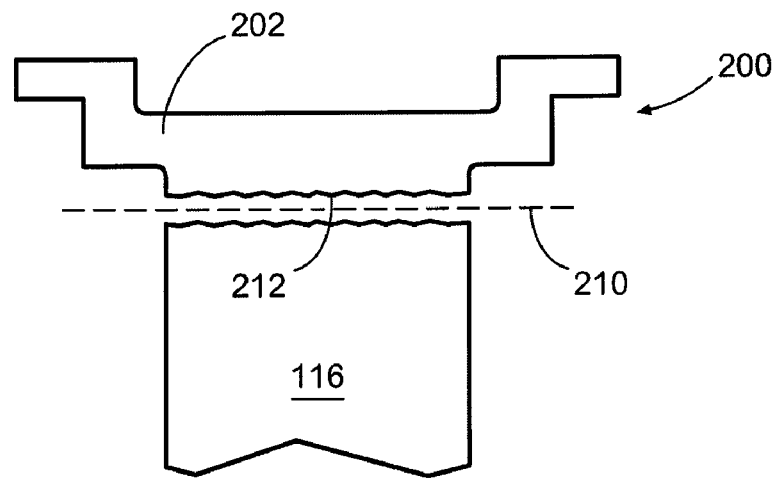
FIG. 3 is a schematic diagram depicting a portion of a representative airfoil assembly after separating the airfoil from the platform.

FIG. 3 is a schematic diagram depicting a portion of airfoil assembly 200 after separating the airfoil (i.e., vane 116) from platform 202. Notably, after removal, a stub portion 212 of the airfoil may remain attached to platform 202.

Separation of the airfoil from the platform 202 is accomplished by cutting the airfoil from the platform. Various procedures such as an electrical discharge machining (EDM) process (e.g., wire EDM), or other machining processes, such as milling, can be used.

Figure 4:
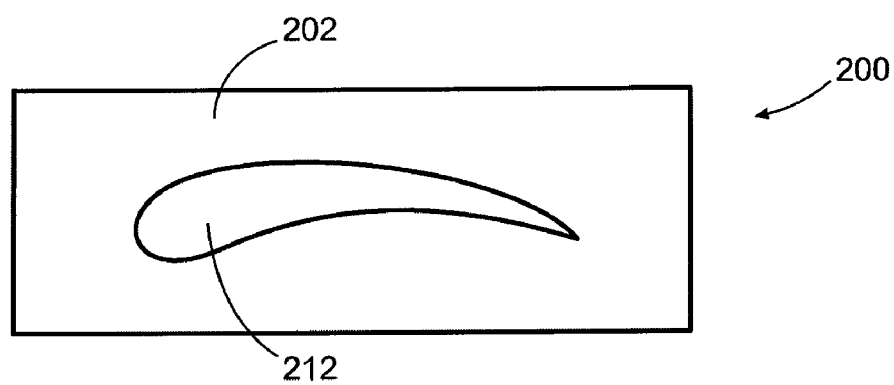
FIG. 4 is a schematic, plan view of the platform of FIG. 4, showing detail of a representative airfoil shape slot in the platform.

FIG. 4 is a schematic diagram showing a plan view of a platform. Specifically, the airfoil section remaining on the platform 202 (i.e., stub portion 212) is used to form and align an EDM electrode or to align a milling process. The number 212 is also is representative of an electrical discharge machining electrode having a shape and size corresponding to the stub portion 212.

The airfoil slot shape is obtained from the airfoil section left on the platform or from a new airfoil. The airfoil shape is used to obtain an electrode to EDM the airfoil slot or to program a milling machine or laser cutter to produce the airfoil slot shape.

Figure 5:
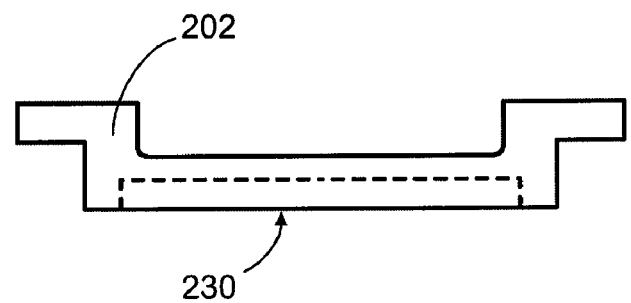
FIG. 5 is a schematic diagram the platform of FIG. 3 after forming a representative depression.

In the embodiment of FIGS. 3-5, removal of material of the airfoil assembly 200 is not limited to airfoil 116 and the associated stub portion 212. In this regard, reference is made to the schematic diagram of FIG. 5, which depicts platform 202 of FIGS. 3 and 4 after forming a representative depression. Specifically, FIG. 5 shows platform 202 after a depression 230, which is sized and shaped to receive a portion of a replacement airfoil (not shown in FIG. 5), is created. The size of depression 230 is slightly larger than the replacement airfoil to allow the replacement airfoil to be placed within the depression along with the attachment material and to maintain structural integrity. The depth of the depression 230 is selected to retain the replacement airfoil and maintain structural integrity of the airfoil and platform.

Figure 6:
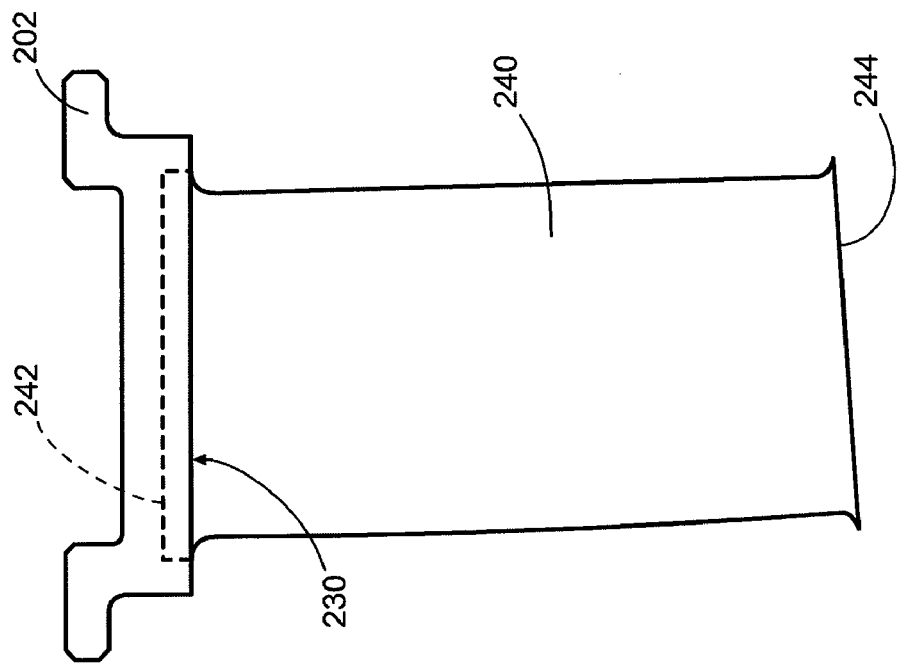
FIG. 6 is a schematic diagram depicting a representative replacement airfoil after attachment to a platform.

In FIG. 6, platform 202 is depicted with a replacement airfoil 240 affixed within depression 230. Replacement airfoil 240 includes a root 242 that is positioned within depression 230, and a tip 244.

In the embodiment of FIG. 6, tack welding is used to securely hold the position of the airfoil while a braze material (e.g., nickel, nickel-platinum or others) is applied around the root 242 within the depression 230. To prevent the braze material from running into unwanted areas during brazing, a brazing aid, or "stop-off" as it is commonly known, can be applied to prevent the flow of flux and metal.

Brazing is accomplished by placing the vane segment with platform 202 and replacement airfoil 240 into a brazing furnace (not shown) for a predetermined time and temperature. Additional heat treatment can be applied for improving material properties, such as for performing precipitation. Subsequent to the brazing process and/or additional heat treatments, non-destructive testing (NDT) can be conducted on the repaired airfoil assembly.

Figure 7:
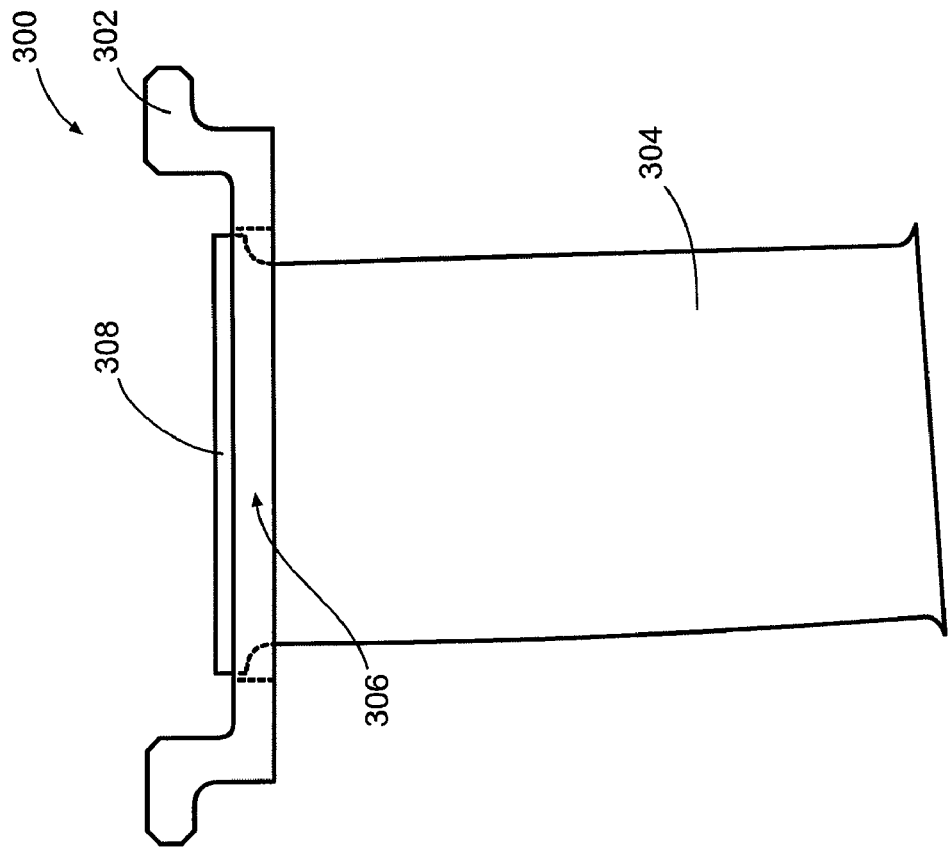
FIG. 7 is a schematic diagram depicting another representative replacement airfoil after attachment to a platform.

In contrast to the embodiment of FIG. 6, which utilizes a depression in the form of a recess, the embodiment of FIG. 7 utilizes a depression in the form of a completely through-cut slot. As shown in FIG. 7, airfoil assembly 300 includes a platform 302 and a replacement airfoil(s) 304. Platform 302 incorporates a slot 306 into which a portion of airfoil 304 is inserted. In this embodiment, airfoil 304 is positioned to extend completely through slot 306 (i.e., portion 308 of the airfoil protrudes outwardly from the slot). However, in other embodiments, the extent of penetration into the slot can vary.

Slot 306 is formed through platform 302 utilizing a machining process, such as that described above with respect to the embodiment of FIG. 2. For instance, a damaged airfoil is separated from the assembly leaving a stub portion, and then a machining process (e.g., EDM, milling, or laser) is used to remove the stub portion and form the slot. After slot formation, replacement airfoil 304 is positioned for affixing to the platform, such as by using a brazing process.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, although only single airfoil replacement of an airfoil assembly has been described, multiple airfoils of an assembly can be replaced in other embodiments. All such modifications and variations are intended to be included herein within the scope of this disclosure and protected by the accompanying claims.

The invention claimed is:

1. A method of repairing a gas turbine airfoil assembly comprising a platform and an airfoil, the method comprising the steps of:
    separating the airfoil from the platform by;
        utilizing an electrical discharge machining process;
        leaving a stub portion of the airfoil attached to the platform;
        connecting a power supply to the stub portion; and
        utilizing an electrical discharge machining electrode of a shape and size corresponding to the stub portion to erode the stub portion and form a depression;
    forming the depression in the platform, the depression being sized and shaped to receive a replacement airfoil; and
    affixing the replacement airfoil within the depression such that the replacement airfoil is attached to the platform.

2. The method of claim 1, wherein separating the airfoil comprises utilizing a machining process for separating the airfoil from the platform.

3. The method of claim 1, wherein forming a depression comprises utilizing a machining process for forming the depression in the platform.

4. The method of claim 1, wherein the depression is a slot extending completely through the platform.

5. The method of claim 4 wherein a portion of the replacement airfoil extends completely through the slot after the affixing.

6. The method of claim 1 further comprising positioning the replacement airfoil within the depression such that a desired length of the replacement airfoil extends outwardly from the platform.

7. The method of claim 1 wherein affixing comprises brazing the replacement airfoil to the platform.

8. The method of claim 7 wherein affixing further comprises tack welding the replacement airfoil to the platform such that at least a portion of the replacement airfoil extends into the depression prior to the brazing.

9. The method of claim 1, wherein the airfoil assembly is a stator assembly and the airfoil is a vane.

10. The method of claim 1, wherein the platform is an outer diameter platform.

11. The method of claim 1, wherein the airfoil is a cantilevered airfoil, the platform being a single platform to which the airfoil is affixed.

12. The method of claim 11, wherein the platform is an outer diameter platform.

13. The method of claim 1, wherein the gas turbine airfoil assembly is an airfoil assembly of a high pressure compressor.

14. The method of claim 1, wherein, in forming the depression, any remaining portion of the airfoil is removed from the platform.

15. A method of repairing a gas turbine airfoil assembly comprising a platform and an airfoil, the method comprising the steps of:
    separating the airfoil from the platform by;
        utilizing an electrical discharge machining process;

leaving a stub portion of the airfoil attached to the platform;

connecting a power supply to the stub portion; and utilizing an electrical discharge machining electrode of a shape and size corresponding to the stub portion to erode the stub portion and form a depression, forming the depression in the platform, the depression being sized and shaped to receive a replacement airfoil; and affixing the replacement airfoil within the depression such that the replacement airfoil is attached to the platform.

16. The method of claim 15, wherein:

the depression is a slot extending completely through the platform; and a portion of the replacement airfoil extends into the slot after the affixing.

17. The method of claim 15, wherein affixing comprises brazing the replacement airfoil to the platform.

* * * * *